United States Patent
Jörimann et al.

(10) Patent No.: US 12,025,473 B2
(45) Date of Patent: Jul. 2, 2024

(54) METHOD AND DEVICE FOR DETERMINING AN OBSERVABLE PROPERTY OF AN OBJECT

(71) Applicant: Mettler-Toledo GmbH, Greifensee (CH)

(72) Inventors: Urs Jörimann, Bertschikon (CH); Urs Wüst, Hombrechtikon (CH); Andreas Dängeli, Winterthur (CH); Moosa Abrahams, Greifensee (CH)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 17/444,589

(22) Filed: Aug. 6, 2021

(65) Prior Publication Data
US 2022/0042834 A1 Feb. 10, 2022

(30) Foreign Application Priority Data
Aug. 7, 2020 (DE) .......................... 102020004841.2

(51) Int. Cl.
*G01D 18/00* (2006.01)
*G01D 3/036* (2006.01)
(Continued)

(52) U.S. Cl.
CPC ........... *G01D 18/00* (2013.01); *G05B 19/406* (2013.01); *G01D 3/036* (2013.01); *G01D 18/008* (2013.01);
(Continued)

(58) Field of Classification Search
CPC .. G01D 18/00; G01D 18/008; G01D 2218/10; G01D 3/036; G05B 19/406;
(Continued)

(56) References Cited

U.S. PATENT DOCUMENTS 7,895,011 B2 2/2011 Youssefi et al.
8,294,572 B2 10/2012 Kuris et al.
(Continued)

FOREIGN PATENT DOCUMENTS

CN 101140461 A * 3/2008
CN 102063117 B * 7/2013 ......... G05B 19/4185
(Continued)

OTHER PUBLICATIONS

Mettler Toledo (Moisture Analyzer: Routine Testing, White Paper, Dec. 2011, Mettler-Toledo AG, Laboratory & Weighing Technologies) (Year: 2011).*
(Continued)

*Primary Examiner* — Daniel R Miller
*Assistant Examiner* — Christian T Bryant
(74) *Attorney, Agent, or Firm* — Standley Law Group LLP; Jeffrey S. Standley; Adam J. Smith

(57) ABSTRACT

A method, as applied to a program-controlled measuring instrument, determines an observable property of an object. The program-controlled measuring instrument has a diagnostic measurement program that is executed by a user. The diagnostic measurement program stores data related to the execution of the diagnostic measurement program and maintains the data for remote transmission to a remote service entity.

14 Claims, 1 Drawing Sheet

(51) Int. Cl.
  *G05B 19/406* (2006.01)
  *G05B 21/02* (2006.01)
  *G05B 23/02* (2006.01)

(52) U.S. Cl.
  CPC ......... *G01D 2218/10* (2021.05); *G05B 21/02* (2013.01); *G05B 23/02* (2013.01); *G05B 23/0216* (2013.01); *G05B 2219/37446* (2013.01); *G05B 2223/06* (2018.08)

(58) Field of Classification Search
  CPC ...... G05B 2219/37446; G05B 2223/06; G05B 23/0216; G05B 23/02; G05B 21/02
  See application file for complete search history.

(56) References Cited

U.S. PATENT DOCUMENTS

| | | | |
|---|---|---|---|
| 9,523,604 B2 | 12/2016 | Fankhauser et al. | |
| 2015/0027212 A1* | 1/2015 | Fadlun | G05B 23/0245 73/112.05 |
| 2015/0155956 A1 | 6/2015 | Wentland | |
| 2017/0226842 A1 | 8/2017 | Omont et al. | |

FOREIGN PATENT DOCUMENTS

| | | |
|---|---|---|
| JP | H10-318954 A | 12/1998 |
| JP | 2008-292290 A | 12/2008 |
| WO | 99/27354 A1 | 6/1999 |

OTHER PUBLICATIONS

Cipriani ("How to use the Measure app in iOS 12", CNET, Sep. 18, 2018, https://www.cnet.com/tech/services-and-software/how-to-use-measure-app-ios-12/) (Year: 2018).*

Mettler Toledo (Operating Instructions Moisture Analyzer Excellence Plus HX204, Jun. 2014, Mettler-Toledo AG, Laboratory Weighing) (Year: 2014).*

Dearden, H.T., Comparison Alarms for Detection of Measurement Faults, Measurement and Control, Nov. 2014, pp. 273-275, vol. 47, No. 9, The Institute of Measurement and Control.

* cited by examiner

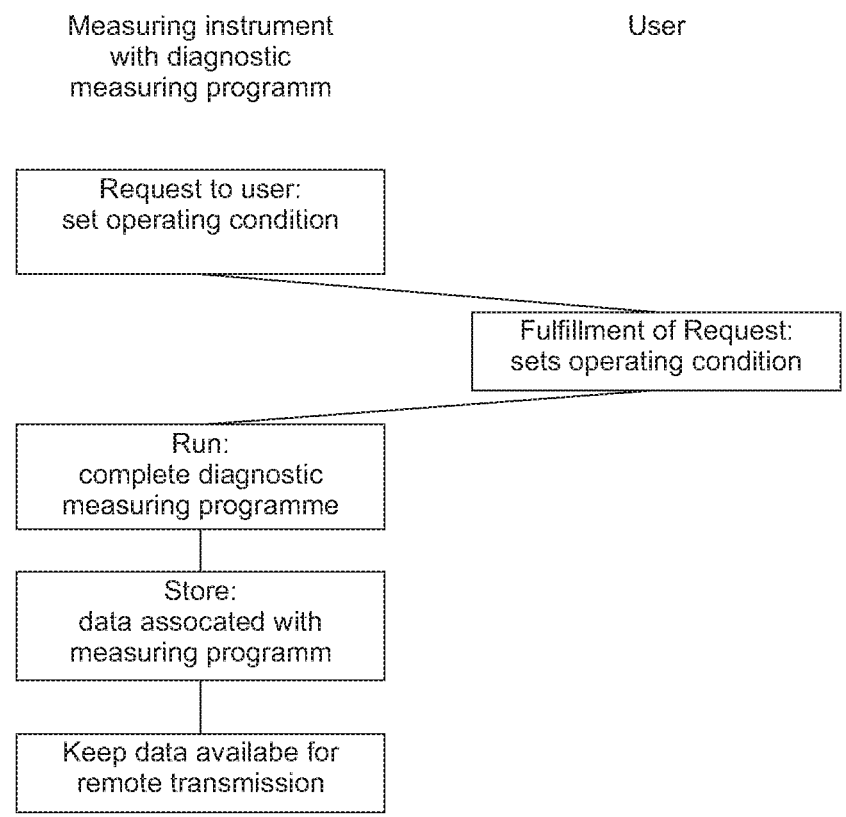

METHOD AND DEVICE FOR DETERMINING AN OBSERVABLE PROPERTY OF AN OBJECT

CROSS-REFERENCE TO RELATED APPLICATIONS

This application makes a claim of priority to German application 102020004841.2, filed on 7 Aug. 2020, which is incorporated by reference as if fully recited herein.

TECHNICAL FIELD

The disclosed invention relates to a method for determining an observable property of an object with a program-controlled measuring instrument, with which the property can be determined by an evaluation of measured values of the object acquired during the course of carrying out a measuring program provided in the measuring instrument, and to a measuring instrument for carrying out the method.

BACKGROUND ART

When a user operates a measuring instrument, malfunctions may occur that lead to a deviation from the regular measuring behavior of the measuring instrument and require a service intervention by which the regular measuring behavior is restored. Traditionally, a service technician performs an investigation of the measuring instrument, in particular using special software maintenance tools, and then decides on the type of service intervention required on the basis of the diagnosis established by the investigation. However, this requires transporting the measuring instrument from the user location to the service entity location or vice versa. In principle, remote servicing could be performed instead of such a transport, but this would require the service entity to have access to the user's data processing system, which is generally undesirable for the user. Even if a user were to accept such access, one difficulty is that the measurement programs of such measurement instruments generally require run times on the order of several hours. Since deviations in the measurement behaviour can manifest themselves at any time during the runtime of the measurement program, this results in an equally long observation period for the service entity with a correspondingly high idle time.

Accordingly, it is a desirable object not met by the prior art to provide a method and a device with which the effort of the service entity conventionally associated with the restoration of the regular measurement behavior is reduced.

SUMMARY OF THE INVENTION

According to the invention, this problem is solved with regard to the method in that a diagnostic measurement program is provided in the measuring instrument which, when called up, requests the setting of at least one operating condition of the measuring instrument from its user and, after this request has been fulfilled, completely executes the diagnostic measurement program and stores data associated with its execution and keeps it ready for remote transmission to a remote service entity.

In terms of devices, the problem is solved by a measuring instrument for carrying out the method with a measuring device for detecting measured values of an object, a control device for controlling the measuring operation of the measuring device in accordance with a measuring program provided in the control device, and an evaluation device for determining an observable property of the object as a function of the measured values detected during the carrying out of the measuring program, characterised in that the control device is operable in accordance with a diagnostic measuring program provided in the control device, which, when called up, requests the setting of at least one operating condition of the measuring instrument from its user and, after this request has been fulfilled, carries out the diagnostic measuring program completely and stores data associated with its execution and keeps it ready for remote transmission to a remote service instance.

In this context, the property of the measuring program or diagnostic measuring program provided in the control device is to be understood as meaning that it can be installed in both the firmware of the measuring instrument (device software) and in a PC connected to it.

BRIEF DESCRIPTION OF THE DRAWING

The single drawing sheet accompanying this specification is a flowchart of a method for diagnosing a thermal analysis device according to one embodiment of the present invention.

DETAILED DESCRIPTION OF THE INVENTION

Since, according to the invention, the execution of the diagnostic measurement program on the measuring instrument is initiated by its user, either by his own decision or after communication with the service entity, the latter is relieved of time-consuming observation of the program sequence and, especially important, does not need to visit the user's location. In particular, the diagnostic measurement program can be initiated by the user towards the end of his operational working hours and thereafter the program sequence can be fully executed without further interaction. By storing and keeping available data related to the execution of the diagnostic measurement program, the service entity can take over this data at a time convenient for it and, by evaluating this data, create a fault diagnosis and plan a service intervention suitable for rectifying the fault.

The diagnostic measurement program of the measuring instrument can be such that it essentially corresponds to the measurement program of a real measurement process, if necessary, with one or more additions facilitating error detection. Several diagnostic measurement programs can also be provided in the measuring instrument, which differ regarding a fictitious sample provided for the diagnostic measurement process. For example, in the case of a thermal analysis measuring instrument, the measuring process may be provided entirely without a sample, with an empty sample holder or empty measuring crucible on the sample holder. The user has no access to the design of the diagnostic measurement program in detail. He can only make a selection between the specific diagnostic measuring program(s) to be called up if several such diagnostic measuring programs are available.

The operating conditions of the measuring instrument to be set by the user relate especially to their proper condition, for example a necessary cleaning of sample holders, a levelling of the installation of the measuring instrument or the like, or a switching on/off of components, such as a heating, a cooling, a gas supply or the like.

The stored data preferably contain the measured values of the (fictitious) object detected during the implementation of the diagnostic measurement program. In particular, a deviation from the regular measurement behaviour can often be quickly detected visually by a curve representation of these measured values. For the determination of a necessary service intervention, it is also advantageous if the stored data contain device data specifying the measuring instrument. Notably, this can be specifications of device components, whereby the service entity can immediately identify a corresponding spare part.

In particular, the service entity can check the measurement data transmitted to it to ensure that all measurement values are within permissible tolerances. If this is not the case, the service entity diagnoses the possible causes for the non-regular behaviour, informs the user of this and, if necessary, carries out appropriate servicing at the user location. As a result of the diagnostic data previously created by the user at the application site and transmitted to the service entity, it can be ensured that the service technician has all the necessary spare parts with him during his service visit.

The data is preferably saved and transferred in the form of a zip file.

Preferably, the method is carried out on measuring instruments of the following type:
- thermal analysis devices in which a heat flow to a sample is measured as a function of an excitation temperature and thermodynamic parameters of the sample, in particular its complex heat capacity, are determined from this,
- equipment for determining electrochemical properties of a sample, such as pH value, conductivity, ion concentration, oxygen content and suchlike,
- UV/Vs spectrometers,
- melting and drop point devices for measuring melting point, melting range, boiling point, rising melting point, cloud point, dropping point and softening point,
- density meters based on oscillating U-tube technology,
- refractometers for measuring the refractive index and derived quantities, —
- scales, such as laboratory balances and moisture analysers,
- equipment for product inspection, such as check weighers, metal detectors, X-ray inspection systems, visual inspection systems and combined product inspection equipment.

What is claimed is:

1. A method for determining an observable property of an object with a program-controlled measuring instrument, said measuring instrument being a laboratory equipment item for taking scientific measurements, the method comprising the steps of:
   initiating an executable measuring program at the measuring instrument, wherein the measuring instrument comprises:
      a measuring device for detecting measured values of an object;
      a control device for controlling operation of the measuring device; and
      an evaluation device for determining an observable property of the object as a function of the measured values;
      wherein execution of the executable measuring program includes determining, at the measuring instrument, the observable property of the object by evaluating measured values of the object detected by the measuring instrument during the execution of the measuring program; and
   initiating a diagnostic measuring program at the measuring instrument, including:
      requesting a user of the diagnostic measuring program to establish at least one operating condition of the measuring instrument for measuring a fictitious object, wherein the at least one operating condition of the measuring instrument establishes, at least in part, a proper condition of the measuring instrument or establishes, at least in part, a state of a device component of the measuring instrument during execution of the diagnostic measurement program;
      after confirming fulfillment of the request by the user, executing the diagnostic measuring program completely, including executing the executable measuring program for the fictitious object, thereby obtaining data; and
      storing the obtained data at the measuring instrument for subsequent transmission to a remote service entity, whereby the stored data comprises the measured values of the fictitious object detected during the implementation of the diagnostic measurement program.

2. The method of claim 1, wherein the stored data contains instrument data specifying the measuring instrument.

3. The method of claim 1, comprising the further step of:
   transmitting the stored data to the remote service entity; and
   after transmission of the stored data to the remote service entity, receiving a fault diagnosis established therefrom.

4. The method of claim 3, comprising the further step of:
   receiving a service intervention, the service intervention having a scope defined by the remote service entity on the basis of the fault diagnosis.

5. The method of claim 3 wherein:
   the stored data comprises data sufficient to generate a curve representing the measured values; and
   generating, at the remote service entity, the curve representing the measured values.

6. The method of claim 1, wherein the measuring instrument is a thermal analyzer, an analyzer for determining an electrochemical property, a melting or dropping point device for titration, a device for UV/Vis spectroscopy, a density meter or a refractometer, or a weighing device, including a laboratory balance or a moisture analyzer, or a product inspection device, including a check weigher, a metal detector for X-ray inspection, for visual inspection or a combined product inspection device.

7. The method of claim 1 wherein:
   the proper condition of the measuring instrument comprises at least one of: cleaning sample holders, leveling of an installation of the measuring instrument, and switching of components comprising at least one of a heating, a cooling, and a gas supply between an on state and an off state.

8. A laboratory measuring instrument for taking scientific measurements, said measuring instrument comprising:
   a measuring device for detecting measured values of an object;
   a control device for controlling operation of the measuring device, the control device having a measuring program and a diagnostic measuring program provided at the control device, the control device configured to cause selective execution of the measuring program and the diagnostic measuring program; and an evaluation device for determining an observable property of the object as a function of the measured values detected when the measuring program is executed;

wherein the diagnostic measuring program provided at the control device, when executed:

requests that at least one operating condition of the measuring instrument be established for measuring a fictitious object, wherein the at least one operating condition of the measuring instrument, when implemented, establishes, at least in part, a proper condition of the measuring instrument or establishes, at least in part, a state of a device component of the measuring instrument during execution of the diagnostic measurement program;

responds to the request being fulfilled by carrying out a remainder of the diagnostic measuring program including executing the executable measuring program for the fictitious object;

causes data associated with the execution of the diagnostic measuring program to be electronically stored at the measuring instrument, where the stored data comprises the measured values of the fictitious object detected during the implementation of the diagnostic measurement program; and maintains the stored data for subsequent transmission to a remote service entity.

9. The measuring instrument of claim 8, wherein the measuring device is a thermal analyzer, an analyzer for determining an electrochemical property, a melting or dropping point device for titration, a device for UV/Vis spectroscopy, a density meter or a refractometer, or a weighing device, including a laboratory balance or a moisture analyzer, or a product inspection device, including a check weigher, a metal detector for X-ray inspection, for visual inspection or a combined product inspection device.

10. The measuring instrument of claim 8 wherein:

the proper condition of the measuring instrument comprises at least one of: cleaning sample holders, leveling of an installation of the measuring instrument, and switching of components comprising at least one of a heating, a cooling, and a gas supply between an on state and an off state.

11. A method for facilitating remote diagnosis of a measuring instrument, said measuring instrument being a laboratory equipment item for taking scientific measurements, said method comprising:

initiating a measuring program electronically stored at the measuring instrument, wherein the measuring instrument comprises:

a measuring device for detecting measured values of an object;

a control device for controlling operation of the measuring device; and an evaluation device for determining an observable property of the object as a function of the measured values;

initiating a diagnostic measuring program electronically stored at the measuring instrument, comprising:

requesting a user of the diagnostic measuring program to establish at least one operating condition for the measuring instrument for execution of the diagnostic measuring program for measuring a fictitious object, wherein the at least one operating condition of the measuring instrument, when implemented, establishes, at least in part, a proper condition of the measuring instrument or establishes, at least in part, a state of a device component of the measuring instrument during execution of the diagnostic measurement program;

only after confirming fulfillment of the request by the user, executing the diagnostic measuring program completely, including executing the executable measuring program for the fictitious object, thereby obtaining data;

storing the obtained data at the measuring instrument, where the stored data comprises the measured values of the fictitious object detected during the implementation of the diagnostic measurement program; and subsequently, transmitting the obtained data to a remote service entity.

12. The method of claim 11 wherein:

the proper condition of the measuring instrument comprises at least one: cleaning sample holders, leveling of an installation of the measuring instrument, and switching of components comprising at least one of a heating, a cooling, and a gas supply between an on state and an off state.

13. The measuring instrument of claim 8 wherein:

the stored data is sufficient to generate, at the remote service entity, a curve representation of the measured values.

14. The method of claim 11 further comprising:

generating, at the remote service entity from the transmitted data, a generated curve representation of the measured values.

* * * * *

UNITED STATES PATENT AND TRADEMARK OFFICE
CERTIFICATE OF CORRECTION

PATENT NO. : 12,025,473 B2
APPLICATION NO. : 17/444589
DATED : July 2, 2024
INVENTOR(S) : Jörimann et al.

It is certified that error appears in the above-identified patent and that said Letters Patent is hereby corrected as shown below:

In the Specification

In Column 3, Line 22, please delete "zip" and insert -- .zip --.

In Column 3, Line 33, please delete "UV/Vs" and insert -- UV/Vis --.

Signed and Sealed this
Twentieth Day of August, 2024

Katherine Kelly Vidal
Director of the United States Patent and Trademark Office